Oct. 31, 1967  C. J. WALL  3,349,500
AGGLOMERATIVE DRYING
Original Filed Jan. 17, 1963

INVENTOR.
CLARENCE J. WALL
BY
Earle R. Marden
ATTORNEY.

3,349,500
AGGLOMERATIVE DRYING
Clarence J. Wall, Westport, Conn., assignor to Dorr-Oliver Incorporated, Stamford, Conn., a corporation of Delaware
Continuation of application Ser. No. 252,203, Jan. 17, 1963. This application Mar. 23, 1966, Ser. No. 538,179
4 Claims. (Cl. 34—10)

ABSTRACT OF THE DISCLOSURE

Method of treating finely divided sticky solids by conditioning said solids with fine dust-like solid particles to reduce the moisture content to within a predetermined range and thereafter subjecting the conditioned solids to agglomerative drying in a fluidized bed.

---

This application is a continuation of Ser. No. 252,203, filed Jan. 17, 1963, now abandoned.

This invention relates to the drying of solids in a fluidized bed and more particularly to a method of controlling the moisture content of inert solids supplied to a fluidized bed for drying.

Prior to this invention the drying of various finely divided solids in a fluidized bed presented several difficulties. Materials such as precipitated or finely crystallized calcium hydrates, magnesium hydrates, calcium carbonates, magnesium carbonates, and other similar materials normally are supplied to the drying operation as a thick sticky mass from a filter, centrifuge, or other dewatering device. Likewise many flotation concentrates are also supplied as thick sticky masses. These thick sticky feeds are not only hard to handle and feed at a desired uniform rate but they also tend to dry in the fluidized bed as large masses causing partial or complete defluidization of the bed. The defluidization of the bed is caused since the sticky feed supplied to the fluidized bed dries in large globs which do not readily lend themselves to fluidization. A constant supply of this material into the bed will then readily defluidize the bed.

It is therefore an object of the invention to provide a method of feeding a wet thick sticky mass of finely divided solids to a fluidized bed at a uniform rate which will not defluidize the bed.

A second object of the invention is to provide a method of controlling the moisture content of a mass of thick sticky finely divided solids being supplied to a fluidized bed for drying.

A still further object of the invention is to provide a method of controlling the amount of carryover product from a fluidized bed by controlling the moisture content of the thick sticky mass of finely divided solids being supplied to the bed.

A fourth object of the invention is to provide a method of simultaneously drying and agglomerating the feed of a wet sticky mass of finely divided solid material being dried in a fluidized bed.

A still further object of the invention is to provide a method of controlling the moisture content of a wet sticky mass of finely divided material being supplied to a fluidized bed drier by mixing a predetermined amount of dry material with the feed.

Another object of the invention is to provide a method of preventing the defluidization of a fluidized bed drier employed for drying masses of thick sticky finely divided solids by mixing a dry product with such solids to form small particles with a dust coating therearound so that such particles will not stick together in the fluidized bed to cause defluidization of the bed.

A still further object of the invention is to provide a method of controlling the moisture content of a feed to a fluidized bed drier consisting of a mass of wet sticky finely divided solids by mixing carryover material from the bed therewith.

Other objects and advantages of the invention will become apparent as the specification proceeds to describe the invention with reference to the accompanying drawings, in which.

Throughout the specification the terms fluidize, fluidized-solids and fluidized bed are used to designate a type of dense-suspension wherein finely-divided solid particles are dispersed in an upwardly moving stream of gas. These particles in a fluidized bed are in turbulent, zig-zag motion and in appearance the fluidized bed resembles a boiling liquid in that it presents a fluid-like level and the particles therein flow under fluistatic head. More importantly the fluidized bed has a high heat capacity and rapid heat transfer within the bed. These qualities result in a very high degree of temperature uniformity throughout the fluidized bed so that the fluidized bed can be referred to as being thermally homogeneous. Prior to this invention fluidized beds, because of the above characteristics, have been employed to dry various materials. The hereinafter disclosed invention provides a method by which wet finely divided thick sticky masses of solids can be economically and efficiently dried in a fluidized bed.

Figure 1:
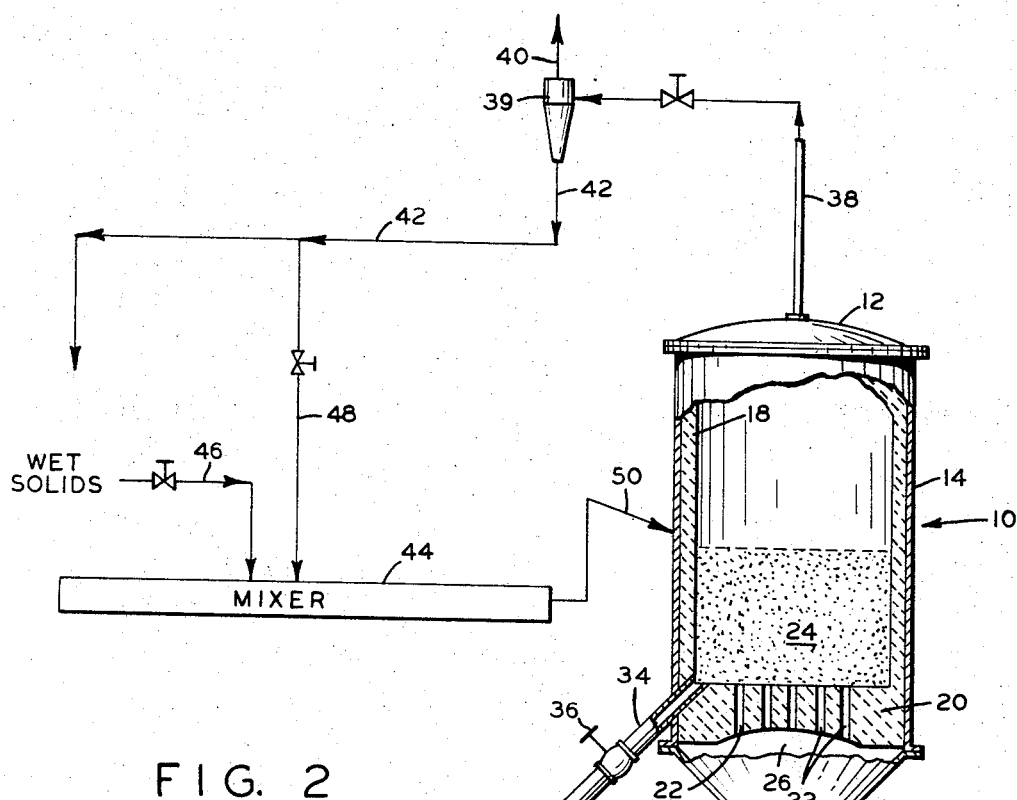
FIG. 1 is a schematic representation of one form of the invention.

Looking now specifically at FIG. 1 there is shown a fluidized bed drier 10 defined by a conical top member 12, an outer annular cylindrical steel shell 14, and a bottom conical plate member 16. The interior of the fluidized bed drier 10 is lined with firebrick 18 or other refractory. At the base of outer shell 14 is located a constriction plate 20 with apertures 22 therein to support the bed of solids 24 to be dried. Apertures 22 are provided to conduct fluidizing gas from the windbox 26 into the fluidized bed of solids 24. Gas for fluidizing bed 24 is introduced into windbox 26 through conduit 28 controlled by valve 30 and passes upwardly through apertures 22 in constriction plate 20. Windbox 26 can also be lined with refractory material, if desired. A clean-out port 32 is located in the bottom of conical bottom member 16 to remove any fine solids which may pass through the apertures 22 in the constriction plate 20 from the bed 24 into the windbox 26. A conduit 34 with valve member 36 therein is provided to control the flow of dried coarser solids from the fluidized bed 24. A conduit 38 is provided at the top of fluidized bed drier 10 to discharge the spent fluidizing gas and entrained fine material therewith from the drier. Conduit 38 supplies the discharge to a conventional dust cyclone 39 which separates the discharge into a gaseous overflow 40 and fine material underflow 42. The gaseous overflow may be discharged to the atmosphere or may be employed to recover any chemical or thermal value left therein. The cyclone underflow 42 basically consists of dried very fine particles of the material supplied to the drier.

In operation the wet solids to be dried are supplied to a mixer 44 of any suitable type by any suitable means such as a screw conveyor and represented by valved line 46. As previously pointed out the wet solids supplied are normally in a wet sticky condition and are very difficult to feed at a uniform rate. To alleviate this condition all or portions of the fine material in the cyclone underflow is also supplied to the mixer 44 via valved conduit 48. In mixer 44 the cyclone underflow fine material and the incoming wet solids are mixed in order to lower the moisture content of the composite feed supplied to the drier 10. Line 50 represents the feed of the composite mixture to the fluidized bed drier. This feed means can be of any conventional type such as screw conveyor, etc. Preferably, the composite mixture supplied to the drier is supplied into the top of fluidized bed 24 but such location is not critical. This feed is supplied into the bed and is fluidized and dried by the upflowing fluidizing gas in the drier. The coarse dried particles which remain in the fluidized bed 24 in constant agitation are discharged through conduit 34 while the finer particles are entrained in the uprising gases and are discharged through conduit 38 as previously described.

The amount of cyclone underflow material mixed with the wet solids feed in the mixer 44 depends on the physical characteristics of the dry product desired. If, however, the wet sticky feed material is mixed with an abnormally large amount of cyclone fines the material may dry to individual particles and present a serious problem of collecting these ultrafines in the drier exhaust gases. Generally, it can be said that the upper moisture limit or the limit of greaest moisture than can be effectively employed would be when the feed material is no longer a thick sticky mass but more or less individual mud balls or agglomerates. The lower moisture limit of the driest feed material which can be effectively employed would be when the feed material no longer consists of agglomerates or where such agglomerates that do exist are soft, friable, and easily broken.

It can be seen that by controlling the moisture content of the composite feed to the fluidized bed that the amount of carryover in the system can be controlled. In other words, the drier the feed the more fine particles will be entrained in exhaust gases from the fluidized bed.

Theoretically, the mixer 44 can completely homogenize the inert solids and the incoming cyclone fines but as a practical matter this is not desired since the power required by the mixer to do this would be very high and also the composite feed to the fluidized bed would be too dry causing increased carryover losses. Ideally the feed to the fluidized bed 24 should be in the form of small mud balls or agglomerates which have a fine dust coating around same so that they will not stick together in the bed and defluidize same.

Preferably, the dry material mixed with the wet solids in the mixer should be the dry fine material recovered from the system but conceivably an external source of dry material, either the same as the wet solids feed or other material which will not cause a reaction, can be employed within the scope of the invention.

Many materials can be dried by the above technique. Basically, the material should be of fine particle size. Any precipitated material or material consisting of fine crystals will be suitable. A partial listing of materials which can be employed in the invention are as follows: (1) *Hydroxides*—aluminum, barium, cadium, calcium, chromium, cobalt, copper, ferric, ferrous, magnesium, manganese, and nickel; (2) *sulfates*—aluminum, barium, cadmium, calcium, chromium, cobalt, copper, ferric, ferrous, magnesium, manganese, nickel, sodium, and zinc; (3) *carbonates*—aluminum, barium, cadmium, calcium, cobalt, lead, magnesium, manganese, nickel, and sodium; (4) *oxides*—calcium, ferric, lead, magnesium, zinc; (5) *sulfur*; and (6) *sodium bicarbonate*.

As previously stated the material which can be employed in the system must be in the form of a fine precipitate or fine crystals. Material which consists predominantly of coarse particles or coarse crystals and contains little or no fines (on the order of 200 mesh) are not considered suitable for this drying technique.

Thet above technique was employed on a sample of magnesium hydroxide filter cake. The filter cake containing 50% $H_2O$ was mixed with dry magnesium hydroxide to form a 32% $H_2O$ feed material to the fluidized bed. This 32% $H_2O$ material was dried to 0% $H_2O$ in the fluidized bed drier with the result that 70% dry agglomerated bed product was recovered with 30% of the product being carried over in the exhaust gases. It can be seen that a substantial percent of bed product has been recovered by this process.

Figure 2:
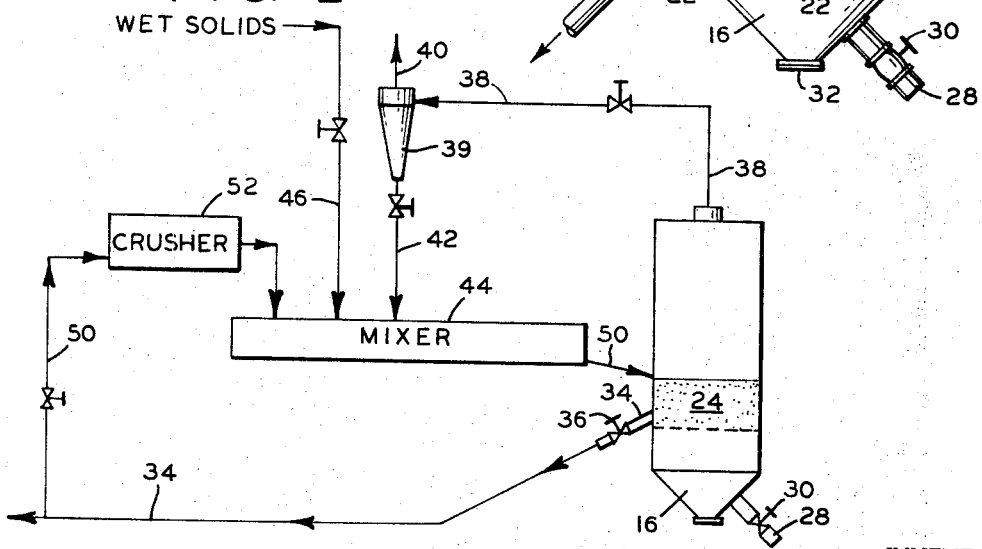
FIG. 2 is a schematic representation of a modified form of the invention shown in FIG. 1.

Looking now at FIG. 2 a modification of the heretofore disclosed invention is shown. In FIG. 2 like reference numerals refer to like components shown in FIG. 1. It has been found that in the use of certain materials that the amount of carryover irrespective of feed moisture, may be such that only a portion of the carryover material can be mixed with the new feed. In other instances with other materials the amount of carryover material available is very small and not sufficient to obtain the desired moisture content in the feed to the fluidized bed drier. In FIG. 2 to alleviate these situations any desired portion of the dry bed product is delivered to the mixer 44 through valved conduit 50 and crusher 52 to supply the additional desired fine dry material necessary to provide a feed to the fluidized bed drier with the desired moisture content. In FIG. 2 all of the underflow material from the cyclone 39 is shown being delivered to the mixer 44 via conduit 42. If desired, a portion of the product can be taken off as dry product prior to the supply of the dry product to the mixer from the cyclone. It will then be necessary to compensate for the removal of such underflow fine dry product by supplying additional crushed bed material from the conduit 34.

The herein disclosed invention provides a means of feeding a wet thick sticky material to a fluidized bed drier at a uniform rate and in a form that will not cause defluidization of the fluidized bed. Another advantage of the invention is that it is possible to dry finely divided solids and obtain dry product in the form of only coarse agglomerates with very little or no fine product. It further offers a means to simultaneously dry and agglomerate finely divided solids, so that, even with large amounts of carryover, the carryover material can be readily recovered since the material carried over is in the form of small agglomerates of individual particles stuck together.

Although I have described in detail the preferred embodiments of my invention, I contemplate that many changes may be made without departing from the scope or spirit of my invention, and I desire to be limited only by the claims.

I claim:
1. The method of treating a wet sticky mass of finely divided inorganic crystalline precipitate having a particle size which is substantially minus 200 mesh which comprises, adding fine dust-like solid particles to said sticky mass to form individual fluidizable size agglomerates, each having a reduced moisture content and each coated with a layer of fine dust, feeding the so-conditioned coated agglomerates to a fluidized bed containing dry agglomerates formed from said material, supplying fluidizing gas to said bed at a temperature sufficient to form said agglomerates by drying, while allowing fines resulting from this drying operation to be carried off with the spent fluidizing gas, and continuously withdrawing the thus formed agglomerates from the bed.

2. Process according to claim 1 wherein said wet sticky mass is a metal salt of a material selected from the group consisting of hydroxides, sulfates, carbonates, bicarbonates, oxides and sulfur.

3. Process according to claim 1 wherein said fine dust-like solids are derived from the solids in said bed.

4. Process according to claim 1 wherein the fine dust-like solids comprise material carried out of the bed with the fluidizing gas.

References Cited

UNITED STATES PATENTS 2,339,932  1/1944  Kuhl.
2,586,818  2/1952  Harms _____ 34—10 X

FOREIGN PATENTS 624,375  7/1961  Canada.
1,113,666  9/1961  Germany.

FREDERICK L. MATTESON, JR., *Primary Examiner.*

D. A. TAMBURRO, *Assistant Examiner.*